May 27, 1958 I. P. KAMINOW 2,836,724

SELF-QUENCHING OSCILLATOR

Filed Dec. 15, 1955 2 Sheets-Sheet 1

INVENTOR
I. P. KAMINOW
BY W. L. Keefauver
ATTORNEY

May 27, 1958 I. P. KAMINOW 2,836,724
SELF-QUENCHING OSCILLATOR
Filed Dec. 15, 1955 2 Sheets-Sheet 2

INVENTOR
I. P. KAMINOW
BY W. L. Keefauver
ATTORNEY 2,836,724

SELF-QUENCHING OSCILLATOR

Ivan P. Kaminow, Orange, N. J., assignor to Bell Telephone Laboratories, Incorporated, New York, N. Y., a corporation of New York Application December 15, 1955, Serial No. 553,329

6 Claims. (Cl. 250—36)

This invention relates to oscillation generators and in particular to such generators in which the output voltage is periodically quenched.

Periodically quenched oscillation waves have many applications. One application is the use of a wave of audio frequency oscillations quenched at a lower audio rate to produce a warbled tone for identifying conductors in a telephone cable. The warbled tone is used because it has been found that such a tone is not easily confused with other tones that might be present on other conductors in the cable. For example, it is often necessary to make a connection to the respective ends of a particular conductor in a cable. In this situation the distinctive warbled tone is applied to one end of the conductor and each conductor at the remote end of the cable is checked until the warbled tone is detected, thus identifying the desired conductor.

Another application of quenched oscillations is in fault location. The oscillations are applied to the faulty conductor pair. Then by means of an inductive pick-up it is possible to locate the point in the cable at which the warbled tone stops or is severely attenuated. The cable may then be opened at that point to locate and repair the fault. Here again the warbled tone is so unlike any other tone generally employed in telephone systems that its presence is readily detectable even though many other signals may be picked up at the same time from the other conductor pairs in the cable.

One object of the invention is to use a minimum amount of apparatus to generate intermittently quenched oscillations such as may be employed, for example, for identifying a conductor pair in a cable.

Another object of this invention is to develop within a conventional transistor oscillator circuit a periodic quenching voltage.

In accordance with one embodiment of the invention a transistor Colpitts oscillator of common base configuration is provided with a choke coil and a capacitor connected in series between the transistor emitter and base electrodes. The choke coil and capacitor cooperate to quench the oscillations periodically and thereby produce a distinctive warbled tone.

One feature of the invention is that transistor circuits are employed with the consequent reduction in size and power requirements as compared to vacuum tube circuits. Another feature of the invention is that the quenching voltage is generated within the basic oscillator circuit.

These and other objects and advantages of the invention will be more apparent from a consideration of the following discussion taken in connection with the attached drawings in which.

Figure 1:
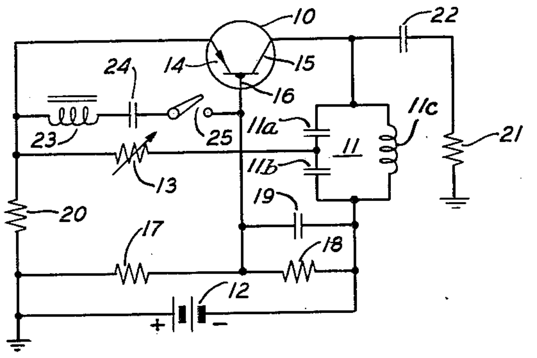
Fig. 1 is a schematic circuit diagram of a Colpitts oscillator embodying this invention.

The oscillator illustrated in Fig. 1 includes a transistor Colpitts oscillator comprising a transistor 10, having an emitter electrode 14, a collector electrode 15, and a base electrode 16, a parallel resonant circuit 11 connected between collector 15 and the negative terminal of a source 12 of operating potential, and a feedback resistor 13 connecting tuned circuit 11 to emitter 14. Circuit 11 is tuned to a predetermined frequency and comprises series-connected capacitors **11*a* and 11*b* connected in parallel with inductance 11*c*. The positive terminal of source 12 is connected to ground. Base 16 of transistor 10 is connected to an intermediate potential point on source 12 by means of the voltage dividing resistors 17 and 18 which are connected in series between the terminals of source 12. A capacitor 19 bypasses alternating current around source 12 and resistor 18. The blocking resistor 20 connected between emitter 14 and ground presents an impedance to alternating currents which is relatively high compared to the conducting impedance of the internal collector-emitter circuit in transistor 10. A load resistor 21 is connected to collector electrode 15 through the coupling capacitor 22**.

In accordance with the invention, a choke coil 23 and quenching capacitor 24 are connectable in series between emitter electrode 14 and base electrode 16 by manually operated switch 25. The cooperation between coil 23 and capacitor 24 produces within the basic oscillation circuit a periodic quenching voltage, at a frequency that is not the resonant frequency of the inductance of coil 23 and the capacitance of capacitor 24. The switch 25 permits the oscillator of Fig. 1 to have either a periodically quenched or an unquenched output.

Figure 2:
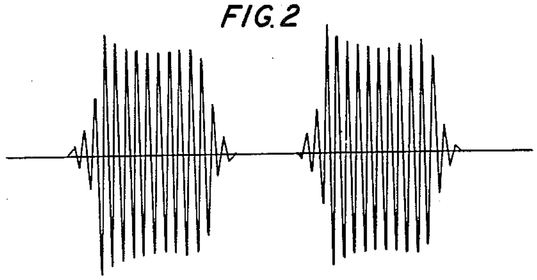
Fig. 2 is a waveshape diagram of the output of the oscillator illustrated in Fig. 1.

When switch 25 is closed periodically quenched oscillations such as those illustrated in Fig. 2 are produced. When switch 25 is open, uniform oscillations are produced in the output as is well known in the case of transistor Colpitts oscillators and no further discussion of this aspect of the circuit operation is believed necessary.

The quenching operation of the oscillator is believed to be as follows: It is first assumed that switch 25 is open and the circuit is oscillating continuously. When switch 25 is closed, current begins to flow in coil 23 and capacitor 24 through the loop illustrated in Fig. 3 to charge capacitor 24. The charging circuit for capacitor 24 includes coil 23, transistor 10, tuned circuit 11, and capacitor 19. The time constant of the charging circuit is much larger than the resonant period of tuned circuit 11. Accordingly, the period of a quenching cycle is much greater than the resonant period of tuned circuit 11, and the generation of oscillations is quenched at a rate which is much less than the resonant frequency of tuned circuit 11.

The current in coil 23 and capacitor 24 has the wave form of rectified oscillations due to the non-linear conduction characteristic of transistor 10. In a circuit employing a p-n-p transistor this rectified current flows in a clockwise direction in the loop shown in Fig. 3, as indicated by the arrow, and charges capacitor 24 in such a way as to tend to make emitter 14 negative with respect to base 16. As the charge on capacitor 24 builds up, this rectified current decreases causing a voltage to be induced in coil 23 which tends to bias emitter 14 positive with respect to base 16. When the charge on capacitor 24 becomes somewhat greater than the induced E. M. F. in coil 23, transistor 10 is biased off and the oscillations are quenched.

Figure 3:
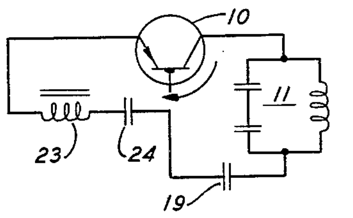
Figs. 3 and 4 are schematic diagrams of portions of the circuit of Fig. 1 shown separately to facilitate the explanation of the circuit operation.
Figure 4:
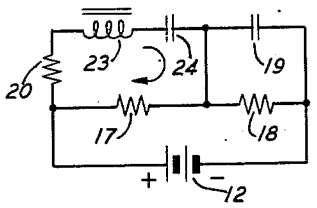

Capacitor 24 then begins to discharge through capacitor 19, source 12, voltage dividing resistors 17 and 18, resistor 20, and coil 23, as illustrated by the arrow in Fig. 4, and begins to charge in the opposite direction toward the potential appearing across resistor 17. As soon as the potential across coil 23 and capacitor 24 becomes slightly positive with respect to the emitter diode, comprising emitter 14 and base 16, of transistor 10 oscillations commence again. The current flowing as illustrated in Fig. 3 displaces the slight positive charge on capacitor 24 and starts to charge capacitor 24 negatively with respect to emitter 14 as described above. The periodic quenching of the generation of oscillations continues with the result that modulated oscillations, which in the audio frequency range may be called a warbled tone, are generated having the waveshape illustrated in Fig. 2.

Figure 5:
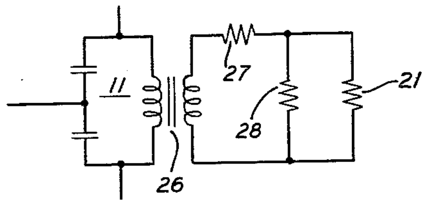
Fig. 5 is a schematic diagram of a modified circuit for coupling the oscillator of Fig. 1 to its load.

A self-quenching oscillator is often used to apply an identifying tone to certain conductors in a cable. In such an application the impedance to which the oscillator is connected may vary widely from one connection to the next thereby affecting the oscillator operation so it is desirable to isolate the oscillator from these changes as well as possible in order to maintain frequency stability, a desired relation between oscillator Off and On times, and substantially uniform power output. The circuit represented by the schematic diagram of Fig. 5 has been found to be useful for this purpose and comprises a transformer 26 having its primary winding arranged as the inductive element of tuned circuit 11. The load resistor 21 is connected across the secondary winding of transformer 26 through an impedance matching pad which includes, for example, the resistors 27 and 28.

The quenching frequency and power output of the oscillator, as well as the ratio of Off time and On time can be regulated by adjusting various elements of the circuit of Fig. 1. For example, capacitor 24 may be used as a primary control for the quenching frequency. The ratio of Off time to On time can be regulated by adjusting any one of capacitor 19, the ratio of the resistance of resistor 17 to the resistance of resistor 18, resistor 20, or resistor 13. As suggested above in connection with Fig. 5, changes in load resistor 21 also have marked effects on oscillator power output and the Off-On symmetry of the quenching envelope.

Changing the ratio between resistors 17 and 18 affects power output and quenching frequency as well as the ratio of quenching Off time to On time, but the latter is its principal effect.

Figure 6:
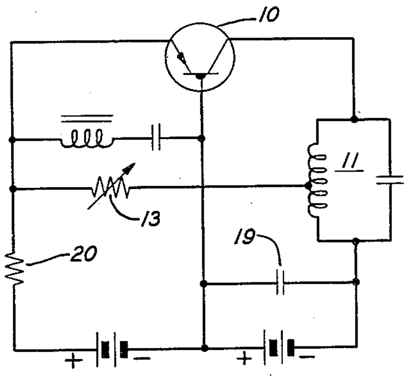
Figs. 6 and 7 are schematic diagrams of modifications of the oscillator circuit shown in Fig. 1.

Fig. 6 illustrates a Hartley type transistor oscillator embodying the invention. The circuit is essentially the same as that illustrated in Fig. 1, but in this case the feedback voltage is taken from a tap on the inductive portion of tank circuit 11 rather than on the capacitive portion.

Figure 7:
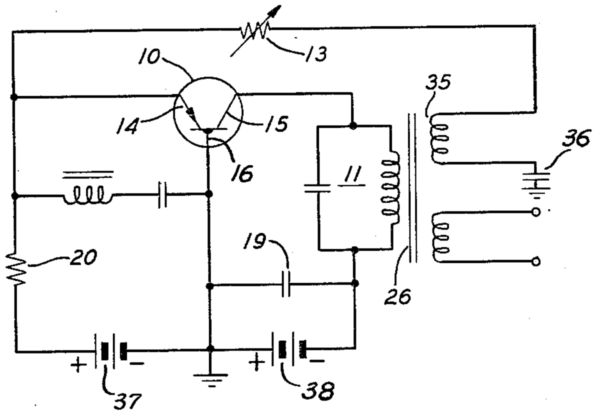

The oscillator circuit of Fig. 7 is also similar to that of Fig. 1. Here, however, the feedback from collector 15 to emitter 14 is obtained by means of a tickler coil 35 on transformer 26. Coil 35 is connected in series with resistor 13 and a decoupling capacitor 36 between ground and emitter electrode 14. In Fig. 7 oscillator operating potential is supplied by two series-connected batteries 37 and 38 having the common terminal of the series connection connected to base 16 and to ground.

Although the invention is described above in its application to specific embodiments thereof it should be understood that this is merely for the purpose of illustration. Other embodiments and applications will be apparent to those skilled in the art, and should be included within the spirit and scope of the appended claims.

What is claimed is:

1. In a circuit for generating oscillations, a transistor having base, emitter and collector electrodes, a parallel resonant circuit connected between said base electrode and one of the remaining ones of said electrodes, a feedback connection from said parallel resonant circuit to a second one of said remaining electrodes, an inductor, a capacitor, means for connecting said inductor and said capacitor in series, between said base electrode and said second electrode, and quenching means including said inductor and said capacitor and connected to said resonant circuit for intermittently quenching the generation of said oscillations, said quenching means having a time constant much greater than the resonant period of said resonant circuit.

2. In a transistor oscillator, a transistor having a base electrode and two other electrodes, a source of operating potential connected to said electrodes, a parallel resonant circuit connected between said base electrode and one of said other electrodes, an inductance, a capacitor, a feedback connection from said circuit to a second of said other electrodes, and quenching means including said inductance and said capacitor connected to said base and second electrodes for periodically quenching the operation of said oscillator at a rate which is much less than the resonant frequency of said circuit.

3. The oscillator as described in claim 2 wherein said feedback connection comprises a coil inductively coupled to said circuit, a decoupling capacitor connected in series with said coil, and means for connecting said series connected coil and decoupling capacitor between said source and said second electrode.

4. An oscillator for generating spaced groups of pulses comprising a transistor having a base electrode, an emitter electrode, and a collector electrode, a source of operating potential having a positive terminal, a negative terminal, and an intermediate potential terminal, a connection from said base electrode to said intermediate potential terminal, a connection from said positive terminal to said emitter electrode, a first inductance, a blocking capacitor, means for connecting said first inductance and said blocking capacitor in series between said emitter and base electrodes, a parallel resonant circuit connected between said negative terminal and said collector electrode and comprising a second inductance and a capacitive impedance, a feedback connection from said capacitive impedance to said emitter electrode, an alternating current connection from said negative terminal to said base electrode, and a charging path for said blocking capacitor comprising said first inductance, the internal emitter-collector circuit of said transistor, said resonant circuit, and said alternating current connection, the time constant of said charging path being much larger than the resonant period of said resonant circuit.

5. A generator of warbled oscillations comprising in combination a semiconductor triode having three electrodes, a source of operating potential having high, low and intermediate potential terminals, a connection from said intermediate terminal to a first one of said triode electrodes, a tuned circuit comprising a first inductance and a capacitor connected in parallel, means connecting said tuned circuit between another of said source terminals and a second one of said triode electrodes, a connection from the remaining source terminal to the third one of said triode electrodes, a feedback connection from said first inductance to said third electrode, a coil, a quenching capacitor, means connecting said coil and said quenching capacitor in series between said first and third triode electrodes, an alternating current charging path for said quenching capacitor comprising said coil, said triode, and said tuned circuit, a discharge path for said quenching capacitor through said source of operating potential, the time constant of said charging path being much greater than the resonant period of said tuned circuit.

6. A self-quenched oscillator comprising a transistor having base, emitter and collector electrodes, a source of direct current potential, a potential divider having its end terminals connected to the terminals of said source, an intermediate terminal on said potential divider, a connection from said intermediate terminal to said base electrode, a parallel resonant circuit comprising an inductance and two series connected capacitors, means connecting said parallel resonant circuit between said collector electrode and one terminal of said source, a bypass capacitor connected between said intermediate terminal and said one terminal of said source, a resistor connected between the other terminal of said source and said emitter electrode, the resistance of said resistor being much larger than the conducting resistance of the internal collector-emitter circuit of said transistor, a variable resistor, a feedback connection including said variable resistor between said emitter electrode and the common terminal of said two series connected capacitors, a quenching capacitor, a choke coil, and means connecting said quenching capacitor and said choke coil in series between said emitter and base electrodes, the time constant of said choke coil and quenching capacitor together with the internal emitter-collector impedance of said transistor, said parallel resonant circuit, and said bypass capacitor being much greater than the resonant period of said parallel resonant circuit.

References Cited in the file of this patent

UNITED STATES PATENTS 2,138,894 Ware ------------------ Dec. 6, 1938